(12) United States Patent
Huang

(10) Patent No.: US 11,346,739 B2
(45) Date of Patent: May 31, 2022

(54) DIAPHRAGM TYPE ULTRA-THIN PRESSURE GAUGE

(71) Applicant: ZHEJIANG FUMAO MACHINERY CO., LTD., Jiaxing (CN)

(72) Inventor: Changqing Huang, Jiaxing (CN)

(73) Assignee: ZHEJIANG FUMAO MACHINERY CO., LTD., Jiaxing (CN)

( * ) Notice: Subject to any disclaimer, the term of this patent is extended or adjusted under 35 U.S.C. 154(b) by 80 days.

(21) Appl. No.: 16/726,856

(22) Filed: Dec. 25, 2019

(65) Prior Publication Data

US 2020/0200635 A1    Jun. 25, 2020

(51) Int. Cl.
*G01L 19/16* (2006.01)
*G01L 7/08* (2006.01)

(52) U.S. Cl.
CPC ............ *G01L 19/16* (2013.01); *G01L 7/08* (2013.01); *G01L 7/082* (2013.01); *G01L 7/084* (2013.01)

(58) Field of Classification Search
CPC ..... G01L 19/147; G01L 9/0042; G01L 19/04; G01L 9/0054; G01L 9/0072; G01L 13/025; G01L 19/14; G01L 19/0038; G01L 19/0084; G01L 9/0055; G01L 9/0075; G01L 19/0069; G01L 9/0052; G01L 9/0073; G01L 19/0092; G01L 19/0618; G01L 19/0645; G01L 19/143; G01L 9/0051; G01L 19/0007; G01L 19/0046; G01L 19/06; G01L 19/0627; G01L 19/0681; G01L 27/002; G01L 9/00; G01L 9/0041; G01L 9/0044; G01L 11/025; G01L 11/04; G01L 19/0023; G01L 19/0672; G01L 19/069; G01L 19/142; G01L 19/145; G01L 19/16; G01L 7/00; G01L 9/0047; G01L 9/06; G01L 9/065; G01L 9/12; G01L 11/02; G01L 13/00; G01L 15/00; G01L 19/0015; G01L 19/003; G01L 19/02; G01L 19/0609; G01L 19/083; G01L 19/10;

(Continued)

(56) References Cited

U.S. PATENT DOCUMENTS

| | | | | |
|---|---|---|---|---|
| 4,733,564 A | * | 3/1988 | Gorge | G01L 7/084 73/715 |
| 5,181,422 A | * | 1/1993 | Leonard | G01L 7/084 73/431 |
| 5,970,796 A | * | 10/1999 | Blake | G01L 7/082 29/509 |
| 6,164,138 A | * | 12/2000 | Blake | G01L 7/063 73/732 |

(Continued)

FOREIGN PATENT DOCUMENTS

| CN | 103674393 A | 3/2014 |
|---|---|---|
| CN | 206862558 U | 1/2016 |

*Primary Examiner* — Andre J Allen

(57) ABSTRACT

The present invention discloses a diaphragm type ultra-thin pressure gauge, including a mounting base, a gauge core inner cover and an elastic diaphragm. The gauge core inner cover includes an inner cover body portion covering on the top surface of the mounting base and an inner cover edge portion located at the outer side of the lower end of the inner cover body portion. An edge of the elastic diaphragm is fixedly clamped between an inner side of the inner cover edge portion and the top surface of the mounting base. The mounting base and the gauge core inner cover are made of a hot-melt plastic. The outer side of the inner cover edge portion is in hot-melt adhesion with the top surface of the mounting base. A diaphragm central hole is provided in the middle of the elastic diaphragm.

8 Claims, 2 Drawing Sheets

(58) Field of Classification Search
CPC ....... G01L 19/148; G01L 27/005; G01L 7/08; G01L 7/082; G01L 7/163; G01L 7/166; G01L 9/0045; G01L 9/0048; G01L 9/006; G01L 9/007; G01L 9/0076; G01L 9/04; G01L 9/045; G01L 9/125; G01L 11/00; G01L 17/00; G01L 19/00; G01L 19/0076; G01L 19/08; G01L 19/141; G01L 19/146; G01L 1/142; G01L 1/2262; G01L 1/246; G01L 21/12; G01L 23/16; G01L 27/007; G01L 7/04; G01L 7/063; G01L 7/084; G01L 7/086; G01L 7/16; G01L 9/0002; G01L 9/0007; G01L 9/0016; G01L 9/0019; G01L 9/0022; G01L 9/0027; G01L 9/0033; G01L 9/0039; G01L 9/005; G01L 9/0058; G01L 9/0077; G01L 9/0079; G01L 9/008; G01L 9/0092; G01L 9/0095; G01L 9/025; G01L 9/08; G01L 9/085; G01L 9/105; G01L 9/14; G01L 9/16
USPC .................................................. 73/700–756
See application file for complete search history.

(56) References Cited

U.S. PATENT DOCUMENTS

2005/0034524 A1\* 2/2005 Saida .................... B01D 46/446
73/715

\* cited by examiner

DIAPHRAGM TYPE ULTRA-THIN PRESSURE GAUGE

TECHNICAL FIELD

The present invention relates to the technical field of pressure gauges, and particularly to a diaphragm type ultra-thin pressure gauge.

BACKGROUND

A Chinese patent application publish No. CN 103674393 A discloses a diaphragm type pressure gauge, a base and an inner cover of which are fixedly connected by a bolt. However, such a bolt connection manner is low in assembly and production efficiency. Moreover, in order to ensure the reliability of the screw connection, there is a need for guaranteeing a certain axial length of the screw connection. Accordingly, the diaphragm pressure gauge is large in thickness, and brings many inconveniences in practical application.

A Chinese patent publish CN 206862558 U discloses a pressure-relief type safety pressure gauge, a fixed frame and a base of which are wrapped and fixedly connected by a curling edge. Such a manner greatly saves the assembly operation time between the fixed frame and the base, and the pressure gauge is small in overall thickness. However, the curling edge is limited in wrapping force. Contents are prone to leak under the action of a relatively high air pressure. Therefore, the pressure-relief type safety pressure gauge is mainly suitable for pressure measurement in a low-pressure closed environment and difficult to apply to high-pressure measurement.

In addition, an elastic diaphragm of the pressure gauge disclosed in the above-mentioned patent document is connected with a pointer transmission assembly of the pressure gauge by employing a threaded member. Such a threaded connection manner limits the possibility of further reducing the overall thickness of the pressure gauge. Based on the above-mentioned problems in the prior art, it is necessary to provide a pressure gauge suitable for pressure measurement in a high-pressure closed environment, and is small in overall thickness, so as to reduce the space size requirement of the pressure gauge for an application environment.

SUMMARY

In order to overcome the shortcomings of the prior art, the present invention provides a diaphragm type ultra-thin pressure gauge, which is suitable for pressure measurement in a high-pressure closed environment, and is small in overall thickness, so as to reduce the space size requirement of the pressure gauge for an application environment.

The technical solution of the present invention to solve its technical problems is as follows.

A diaphragm type ultra-thin pressure gauge includes an elastic diaphragm provided with a diaphragm central hole at a middle portion thereof; and a diaphragm riveting member arranged in the diaphragm central hole, the diaphragm riveting member being provided with a riveting forging head at a lower end thereof.

As a further development of the above technical solution, the diaphragm type ultra-thin pressure gauge further includes a mounting base and a gauge core inner cover, wherein the gauge core inner cover comprises an inner cover body portion covers a top surface of the mounting base and an inner cover edge portion located at an outer periphery of a lower end of the inner cover body portion; an edge of the elastic diaphragm is fixedly clamped between an inner side of the inner cover edge portion and the top surface of the mounting base; the mounting base and the gauge core inner cover are both made of a hot-melt plastic; and an outer side of the inner cover edge portion is in hot-melt adhesion with the top surface of the mounting base.

As a further development of the above technical solution, it further includes a diaphragm clamping protrusion arranged on an outer periphery of the diaphragm riveting member; and an annular gasket mounted around the outer periphery of the diaphragm riveting member, wherein the diaphragm clamping protrusion is located above the elastic diaphragm, and the annular gasket is located below the elastic diaphragm and above the riveting forging head.

As a further development of the above technical solution, the mounting base and the gauge core inner cover are engaged with each other to form a gauge core inner cavity, and the elastic diaphragm divides the gauge core inner cavity into an upper gauge core inner cavity and a lower gauge core inner cavity; a pressure gauge mounting tube is disposed at a bottom of the mounting base, and the pressure gauge mounting tube is communicated with the lower gauge core inner cavity; a pointer rotation shaft, a rotary torsion spring and a spring base are disposed in the upper gauge core inner cavity; the rotary torsion spring is mounted around and fixedly connected with an outer side of the pointer rotation shaft; the spring base is of a helical structure; a lower end of the spring base is fixedly mounted around the outer side of the diaphragm riveting member and located above the diaphragm clamping protrusion; and an upper end of the spring base is configured to match with the rotary torsion spring, and the rotary torsion spring is driven to rotate by an axial movement of the spring base.

As a further development of the above technical solution, a rotation shaft guide hole is provided in a middle portion of the diaphragm riveting member, and a lower end of the pointer rotation shaft is located in the rotation shaft guide hole.

As a further development of the above technical solution, it further includes a reading dial plate arranged on a top of the gauge core inner cover, wherein an upper end of the pointer rotation shaft passes through the top of the gauge core inner cover and the reading dial plate and is provided with a reading pointer; and a pointer pressing plate covering on the pointer rotation shaft, wherein the top of the gauge core inner cover is fixedly connected with the reading dial plate by a dial plate bolt, and the pointer pressing plate is fixed by the dial plate bolt.

As a further development of the above technical solution, the diaphragm type ultra-thin pressure gauge further includes a housing lateral plate disposed on an outer side of the gauge core inner cover; and an upper transparent cover arranged above the gauge core inner cover, wherein a surrounding step and a lateral plate buckle are disposed at a lower end of the housing lateral plate, a limiting step matching with the surrounding step is disposed at an edge of the mounting base, and the lateral plate latch is positioned at a bottom of the mounting base; and an upper cover latch is disposed at the bottom of an edge of the upper transparent cover, and an upper cover engaging groove matching with the upper cover buckle is provided in an inner side of an upper end of the housing lateral plate.

As a further development of the above technical solution, the diaphragm type ultra-thin pressure gauge further includes a mounting base; and a gauge core inner cover, wherein the gauge core inner cover comprises an inner cover body portion covers a top surface of the mounting base and an inner cover edge portion located at an outer periphery of a lower end of the inner cover body portion; an edge of the elastic membrane is fixedly clamped between the inner side of the inner cover edge portion and a top surface of the mounting base; and the inner cover edge portion is further provided with a latching folding portion for covering an edge of the mounting base.

Compared with the prior art, the present invention has the following beneficial effects.

When the diaphragm type ultra-thin pressure gauge provided by the present invention is assembled, the mounting base is in hot-melt adhesion with the gauge core inner cover. The pressure gauge has good air tightness, will not easily cause the leakage of contents under a pressure, and is suitable for pressure measurement in a pressure closed environment. In addition, since the elastic diaphragm is connected with the pointer transmission assembly of the pressure gauge by employing the diaphragm riveting member, such a connection manner results in smaller overall thickness than a bolt connection manner, in order to reduce the space size requirement of the pressure gauge for an application environment. The riveting forging head in the diaphragm riveting member has the advantage of lower cost compared with a fixed bolt in the prior art. Moreover, the mounting base is in hot-melt adhesion with the gauge core inner cover to form an integrated structure, which is beneficial to the reduction of the overall thickness of the pressure gauge.

BRIEF DESCRIPTION OF THE DRAWINGS

The present invention will be further described below with reference to accompanying drawings and embodiments.

DESCRIPTION OF THE EMBODIMENTS

First Embodiment

Figure 1:
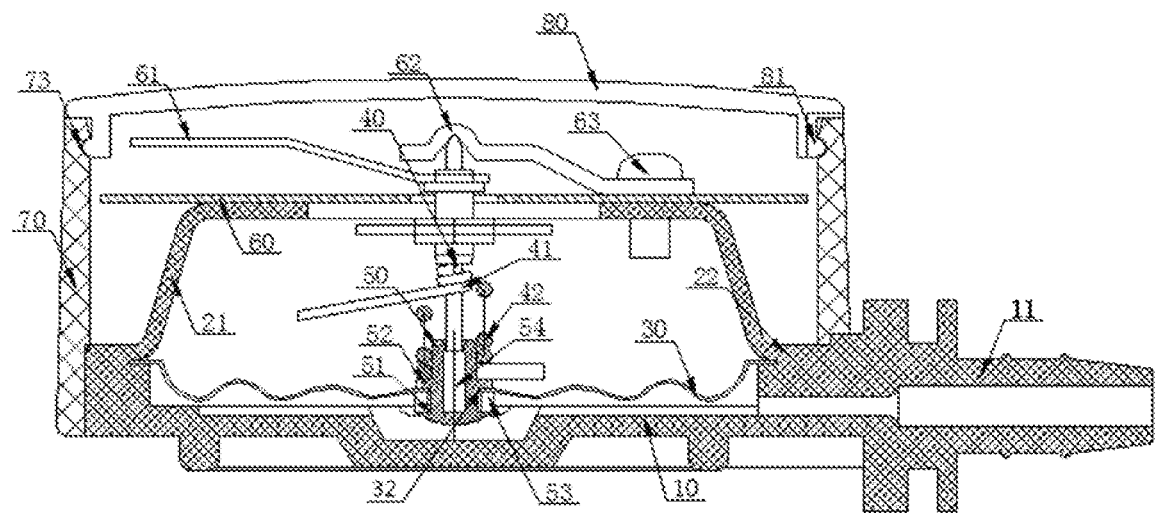
FIG. 1 is a schematic diagram showing a structure of a first specific embodiment of the present invention.

Reference is made to FIG. 1, which is a diaphragm type ultra-thin pressure gauge provided in this embodiment. The diaphragm type ultra-thin pressure gauge includes a mounting base 10, a gauge core inner cover and an elastic diaphragm 30. The gauge core inner cover includes an inner cover body portion 21 reversely covers on the top surface of the mounting base 10 and an inner cover edge portion 22 located outside the lower end of the inner cover body portion 21. The edge of the elastic diaphragm 30 is fixedly clamped between the inner side of the inner cover edge portion 22 and the top surface of the mounting base 10. The mounting base 10 and the gauge core inner cover are both made of a hot-melt plastic. The outer side of the inner cover edge portion 22 is in hot-melt adhesion with the top surface of the mounting base 10. A diaphragm central hole 32 is provided in the middle of the elastic diaphragm 30. A diaphragm riveting member 50 is arranged in the diaphragm central hole 32. A riveting forging head 51 is arranged at the lower end of the diaphragm riveting member 50.

Particularly, a diaphragm clamping protrusion 52 is arranged on the outer side of the diaphragm riveting member 50. An annular gasket 53 is sleeved on the outer side of the diaphragm riveting member 50. The diaphragm clamping protrusion 52 is located above the elastic diaphragm 30. The annular gasket 53 is located below the elastic diaphragm 30 and located above the riveting forging head 51. The mounting base 10 and the gauge core inner cover are latched to each other to form a gauge core inner cavity, and the elastic diaphragm 30 divides the gauge core inner cavity into an upper gauge core inner cavity and a lower gauge core inner cavity. A pressure gauge mounting tube 11 is arranged at the bottom of the mounting base 10, and the pressure gauge mounting tube 11 is communicated with the lower gauge core inner cavity. A pointer rotation shaft 40, a rotary torsion spring 41 and a spring base 42 are arranged in the upper gauge core inner cavity. The rotary torsion spring 41 is mounted around and fixedly connected with the outer side of the pointer rotation shaft 40. The spring base 42 is of a helical structure. The lower end of the spring base 42 is fixedly mounted around the outer side of the diaphragm riveting member 50 and located above the diaphragm clamping protrusion 52. The upper end of the spring base 42 is configured to match with the rotary torsion spring 41. The rotary torsion spring 41 is driven to rotate by an axial movement of the spring base 42. A rotation shaft guide hole 54 is provided in the middle of the diaphragm riveting member 50. The lower end of the pointer rotation shaft 40 is located within the rotation shaft guide hole 54.

Further, a reading dial plate 60 is further arranged on the top of the gauge core inner cover. The upper end of the pointer rotation shaft 40 passes through the top of the gauge core inner cover and the reading dial plate 60 and is provided with a reading pointer 61. A pointer pressing plate 62 is covered above the pointer rotation shaft 40. The top of the gauge core inner cover is fixedly connected with the reading dial plate 60 by a dial plate bolt 63, and the pointer pressing plate 62 is fixed by the dial plate bolt 63 as well. The diaphragm type ultra-thin pressure gauge further includes a housing lateral plate 70 arranged on the outer side of the gauge core inner cover, and an upper transparent cover 80 arranged above the gauge core inner cover. An upper cover latch 81 is arranged at the bottom of the edge of the upper transparent cover 80. An upper cover engaging groove 73 matching with the upper cover latch 81 is provided in the inner side of the upper end of the housing lateral plate 70.

When the above-mentioned diaphragm type ultra-thin pressure gauge is assembled, the pointer rotation shaft 40 is firstly sleeved into the rotation shaft guide hole 54, then the lower end of the diaphragm riveting member 50 passes through the diaphragm central hole 32, then the annular gasket 53 is mounted around the outer side of the diaphragm riveting member 50, and finally the riveting forging head 51 is cold-forged, so that the elastic diaphragm 30 is firmly clamped by the annular gasket 53 and the diaphragm clamping protrusion 52. Then, the spring base 42 is fixedly mounted around the outer side of the upper end of the diaphragm riveting member 50. The lower end of the pointer rotation shaft 40 is aligned with the rotation shaft guide hole 54. The edge of the elastic diaphragm 30 is placed between the inner side of the inner cover edge portion 22 and the top surface of the mounting base 10. The reading pointer 61, the pointer rotation shaft 40, and the rotary torsion spring 41 are assembled into an integrated structure. Then, the outer side of the inner cover edge portion 22 is in holt-melt adhesion with the top surface of the mounting base 10. Finally, the reading dial plate 60, the reading pointer 61, and the pointer pressing plate 62 are assembled, and then the housing lateral plate 70 and the upper transparent cover 80 are assembled.

When the above-mentioned diaphragm type ultra-thin pressure gauge operates, a pressure in a measured system is transmitted to the lower gauge core inner cavity through the pressure gauge mounting tube 11, so that the elasticity of the elastic diaphragm 30 is overcome. In this way, the diaphragm riveting member 50 is upwards lifted. The diaphragm riveting member 50 drives the spring base 42 to move upwards. The spring base 42 drives the rotary torsion spring 41 to rotate when moving upwards. The pointer rotation shaft 40, the reading pointer 61 and the rotary torsion spring 41 rotate synchronously. When the elastic diaphragm 30 is stable, the reading may be performed through the reading dial plate 60 and a position indicated by the reading pointer 61, When the pressure in the measured system decreases, the elastic diaphragm 30 drives the diaphragm riveting member 50 and the spring base 42 to move downwards under the action of the elasticity of the elastic diaphragm 30, so that the rotation torsion spring 41 drives the reading pointer 61 to rotate, so that the reading indicated by the reading pointer 61 decreases.

Second Embodiment

Figure 2:
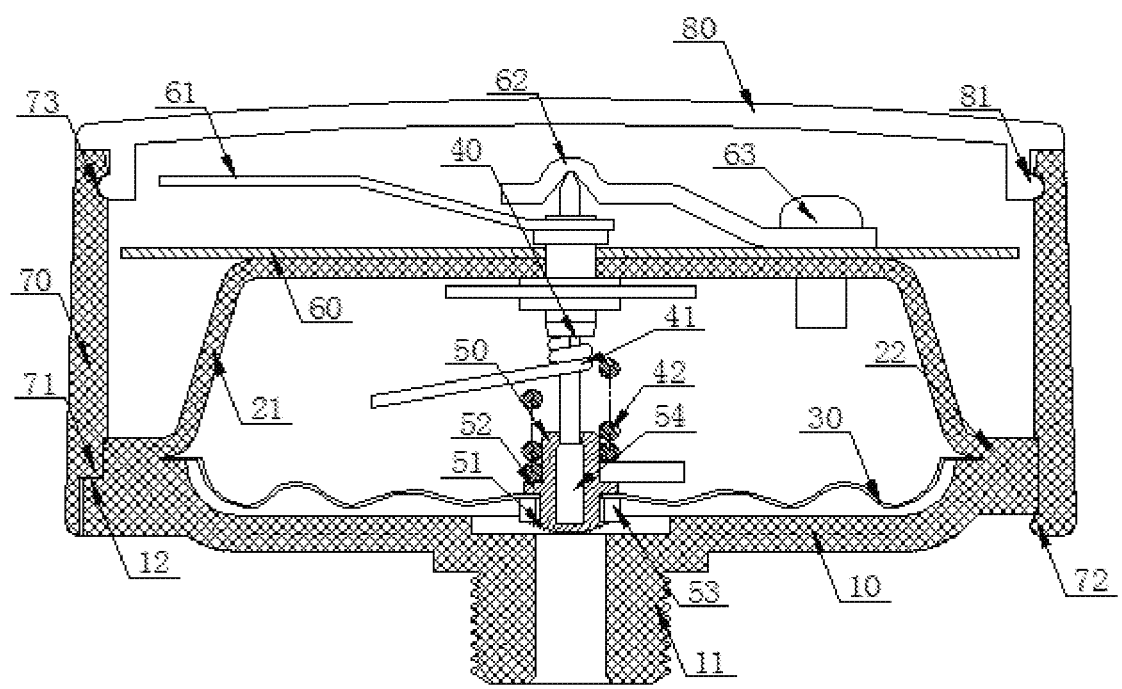
FIG. 2 is a schematic diagram showing a structure of a second specific embodiment of the present invention.

Reference is made to FIG. 2, which is a diaphragm type ultra-thin pressure gauge provided in this embodiment. A main structure of the diaphragm type ultra-thin pressure gauge is the same as that of the first specific embodiment, except that:

an axis of the pressure gauge mounting tube 11 in the first specific embodiment is perpendicular to the pointer rotation shaft 40, and an axis of the pressure gauge mounting tube 11 in this embodiment is parallel to the pointer rotation shaft 40, or the axis of the pressure gauge mounting tube 11 is collinear with the pointer rotation shaft 40. Moreover, in this embodiment, a surrounding step 71 and a lateral plate latch 72 are arranged at the lower end of the housing lateral plate 70, and a limiting step 12 matching with the surrounding step 71 is arranged at the edge of the mounting base 10, and the lateral plate latch 72 is located at the bottom of the mounting base 10.

Third Embodiment

Figure 3:
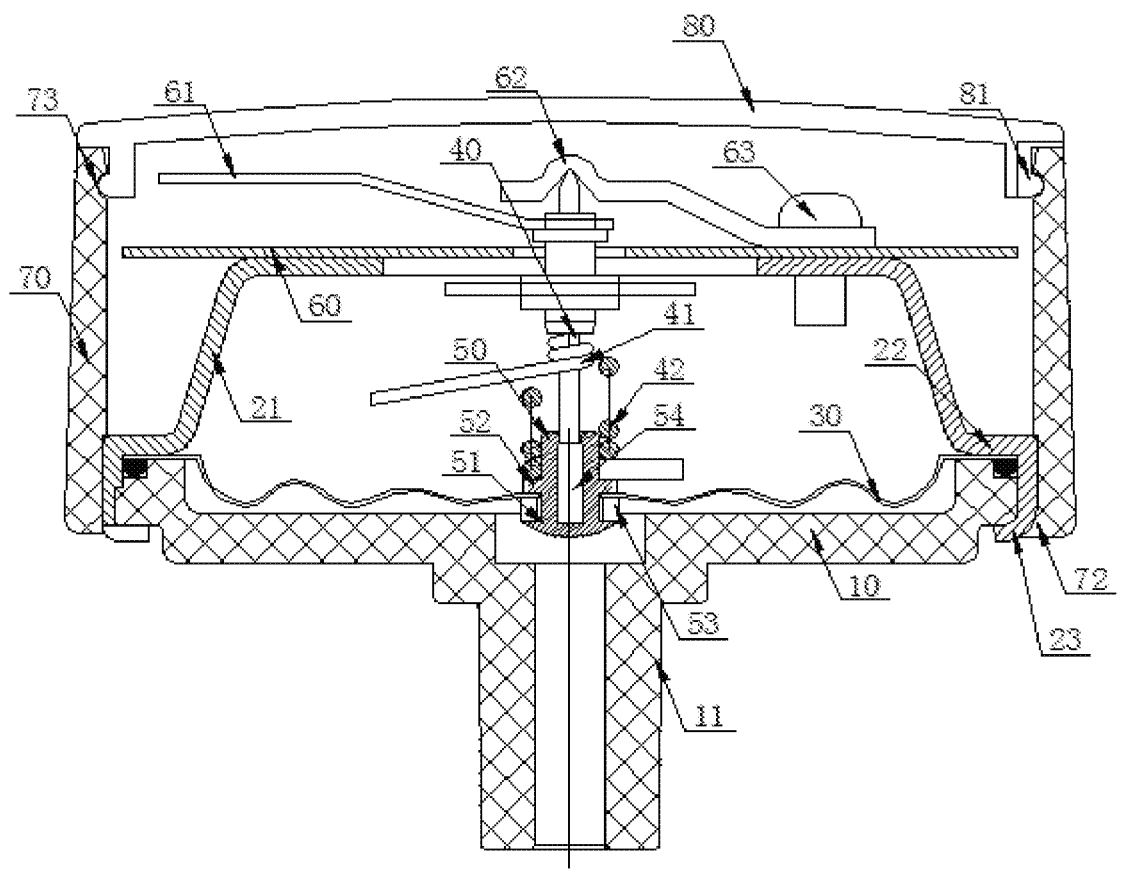
FIG. 3 is a schematic diagram showing a structure of a third specific embodiment of the present invention.

Reference is made to FIG. 3, which is a diaphragm type ultra-thin pressure gauge provided in this embodiment. A main structure of the diaphragm type ultra-thin pressure gauge is the same as that of the first specific embodiment, except that:

the mounting base 10 and the gauge core inner cover in the first specific embodiment are both made of a hot-melt plastic, and the outer side of the inner cover edge portion 22 is in hot-melt adhesion with the top surface of the mounting base 10. However, in this embodiment, the inner cover edge portion 22 is further provided with a latching and folding portion 23 for wrapping the edge of the mounting base 10, and the mounting base 10 is fixedly connected with the gauge core inner cover by means of the latching and folding portion 23.

The preferred embodiments of the present invention have been specifically described above. Certainly, the present invention may further employ different forms from the above embodiments. Equivalent substitutions or corresponding changes made by those skilled in the art without departing from the spirit of the present invention should fall within the scope of protection of the present invention.

What is claimed is:

1. A diaphragm type ultra-thin pressure gauge, comprising:
   an elastic diaphragm provided with a diaphragm central hole at a middle portion thereof; and
   a diaphragm riveting member arranged in the diaphragm central hole, the diaphragm riveting member being provided with a riveting forging head at a lower end thereof, the riveting forging head is a riveting forging head that is produced by cold-forging after the lower end of the diaphragm riveting member passes through the central hole of the diaphragm, a rotation shaft guide hole is provided in the diaphragm riveting member, and the rotation shaft guide hole comprises an inner blind bore portion with a first diameter and a neck portion with a second diameter which is smaller than the first diameter.

2. The diaphragm type ultra-thin pressure gauge according to claim 1, further comprising a mounting base and a gauge core inner cover, wherein the gauge core inner cover comprises an inner cover body portion covers a top surface of the mounting base and an inner cover edge portion located at an outer periphery of a lower end of the inner cover body portion; an edge of the elastic diaphragm is fixedly clamped between an inner side of the inner cover edge portion and the top surface of the mounting base; the mounting base and the gauge core inner cover are both made of a hot-melt plastic; and an outer side of the inner cover edge portion is in hot-melt adhesion with the top surface of the mounting base.

3. The diaphragm type ultra-thin pressure gauge according to claim 2, further comprising: a diaphragm clamping protrusion arranged on an outer periphery of the diaphragm riveting member; and
   an annular gasket mounted around the outer periphery of the diaphragm riveting member,
   wherein the diaphragm clamping protrusion is located above the elastic diaphragm, and the annular gasket is located below the elastic diaphragm and above the riveting forging head.

4. The diaphragm type ultra-thin pressure gauge according to claim 3, wherein the mounting base and the gauge core inner cover are engaged with each other to form a gauge core inner cavity, and the elastic diaphragm divides the gauge core inner cavity into an upper gauge core inner cavity and a lower gauge core inner cavity; a pressure gauge mounting tube is disposed at a bottom of the mounting base, and the pressure gauge mounting tube is communicated with the lower gauge core inner cavity; a pointer rotation shaft, a rotary torsion spring and a spring base are disposed in the upper gauge core inner cavity; the rotary torsion spring is mounted around and fixedly connected with an outer side of the pointer rotation shaft; the spring base is of a helical structure; a lower end of the spring base is fixedly mounted around the outer side of the diaphragm riveting member and located above the diaphragm clamping protrusion; and an upper end of the spring base is configured to match with the rotary torsion spring, and the rotary torsion spring is driven to rotate by an axial movement of the spring base.

5. The diaphragm type ultra-thin pressure gauge according to claim 4, wherein a rotation shaft guide hole is provided in a middle portion of the diaphragm riveting member, and a lower end of the pointer rotation shaft is located in the rotation shaft guide hole.

6. The diaphragm type ultra-thin pressure gauge according to claim 4, further comprising:
   a reading dial plate arranged on a top of the gauge core inner cover, wherein an upper end of the pointer rotation shaft passes through the top of the gauge core inner cover and the reading dial plate and is provided with a reading pointer; and a pointer pressing plate covering on the pointer rotation shaft, wherein the top of the gauge core inner cover is fixedly connected with the reading dial plate by a dial plate bolt, and the pointer pressing plate is fixed by the dial plate bolt.

7. The diaphragm type ultra-thin pressure gauge according to claim 2, further comprising:

a housing lateral plate disposed on an outer side of the gauge core inner cover; and an upper transparent cover arranged above the gauge core inner cover, wherein a surrounding step and a lateral plate buckle are disposed at a lower end of the housing lateral plate, a limiting step matching with the surrounding step is disposed at an edge of the mounting base, and the lateral plate latch is positioned at a bottom of the mounting base; and an upper cover latch is disposed at the bottom of an edge of the upper transparent cover, and an upper cover engaging groove matching with the upper cover buckle is provided in an inner side of an upper end of the housing lateral plate.

8. The diaphragm type ultra-thin pressure gauge according to claim 1, further comprising a mounting base; and a gauge core inner cover, wherein the gauge core inner cover comprises an inner cover body portion covers a top surface of the mounting base and an inner cover edge portion located at an outer periphery of a lower end of the inner cover body portion; an edge of the elastic membrane is fixedly clamped between the inner side of the inner cover edge portion and a top surface of the mounting base; and the inner cover edge portion is further provided with a latching folding portion for covering an edge of the mounting base.

* * * * *